US009585083B2

United States Patent
Li et al.

(10) Patent No.: US 9,585,083 B2
(45) Date of Patent: Feb. 28, 2017

(54) APPARATUS AND METHOD FOR SUPPORTING NETWORK ENTRY IN A MILLIMETER-WAVE MOBILE BROADBAND COMMUNICATION SYSTEM

(75) Inventors: Ying Li, Garland, TX (US); Zhouyue Pi, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/489,397

(22) Filed: Jun. 5, 2012

(65) Prior Publication Data
US 2012/0320874 A1 Dec. 20, 2012

Related U.S. Application Data

(60) Provisional application No. 61/498,380, filed on Jun. 17, 2011.

(51) Int. Cl.
| | |
|---|---|
| *H04W 36/00* | (2009.01) |
| *H04W 48/12* | (2009.01) |
| *H04W 16/28* | (2009.01) |
| *H04W 48/20* | (2009.01) |
| *H04W 72/04* | (2009.01) |
| *H04W 74/00* | (2009.01) |
| *H04B 7/06* | (2006.01) |

(52) U.S. Cl.
CPC ........... *H04W 48/12* (2013.01); *H04B 7/0619* (2013.01); *H04B 7/0695* (2013.01); *H04W 16/28* (2013.01); *H04W 48/20* (2013.01); *H04W 72/046* (2013.01); *H04W 74/002* (2013.01)

(58) Field of Classification Search
CPC .................................................... H04W 48/12

USPC ..... 455/517, 452.1; 370/338, 329, 252, 312, 370/328

See application file for complete search history.

(56) References Cited

U.S. PATENT DOCUMENTS

| 6,366,776 B1 * | 4/2002 | Wright et al. ................ 455/427 |
|---|---|---|
| 8,102,802 B2 * | 1/2012 | Ratasuk ................ H04J 11/005 370/329 |
| 8,400,974 B2 * | 3/2013 | Mueck et al. ................ 370/329 |

(Continued)

FOREIGN PATENT DOCUMENTS

CN            1725653 A      1/2006

OTHER PUBLICATIONS

International Search Report dated Dec. 26, 2012 in connection with International Patent Application No. PCT/KR2012/004771.

(Continued)

*Primary Examiner* — Parth Patel

(57) ABSTRACT

A method for a base station to support network entry of a mobile station in a communication system is provided. The method includes transmitting to the mobile station each of a plurality of transmitted network entry signals over a preferred downlink beam corresponding to the transmitted network entry signal. Each of a plurality of received network entry signals is received from the mobile station over a preferred uplink beam corresponding to the received network entry signal. Each of the transmitted network entry signals comprises the preferred uplink beam corresponding to a subsequently received network entry signal, and each of the received network entry signals comprises the preferred downlink beam corresponding to a subsequently transmitted network entry signal.

19 Claims, 12 Drawing Sheets

(56) References Cited

U.S. PATENT DOCUMENTS

| | | | |
|---|---|---|---|
| 8,565,138 B1* | 10/2013 | Yuan et al. ............... | 370/312 |
| 8,767,638 B2* | 7/2014 | Wu .................... | H04L 5/001 |
| | | | 370/329 |
| 8,767,664 B2* | 7/2014 | Taoka ................ | H04L 1/1607 |
| | | | 370/329 |
| 8,804,580 B2* | 8/2014 | Anderson ......... | H04W 72/0413 |
| | | | 370/252 |
| 2002/0136170 A1* | 9/2002 | Struhsaker ............. | 370/280 |
| 2009/0005099 A1* | 1/2009 | Jung et al. .............. | 455/517 |
| 2009/0041246 A1* | 2/2009 | Kitazoe ............... | H04W 12/02 |
| | | | 380/270 |
| 2009/0042617 A1* | 2/2009 | Li ..................... | H04L 1/0017 |
| | | | 455/562.1 |
| 2009/0160707 A1* | 6/2009 | Lakkis .................. | 342/367 |
| 2009/0181691 A1* | 7/2009 | Kotecha et al. ......... | 455/452.1 |
| 2009/0232240 A1 | 9/2009 | Lakkis | |
| 2009/0232245 A1 | 9/2009 | Lakkis | |
| 2010/0075677 A1* | 3/2010 | Wang et al. ............ | 455/436 |
| 2010/0091892 A1* | 4/2010 | Gorokhov ............. | 375/260 |
| 2010/0164802 A1 | 7/2010 | Li et al. | |
| 2010/0311469 A1 | 12/2010 | Smith et al. | |
| 2011/0007721 A1* | 1/2011 | Taghavi Nasrabadi ......... | H04W 72/046 |
| | | | 370/338 |
| 2011/0026503 A1* | 2/2011 | Mueck et al. ........... | 370/338 |
| 2011/0038299 A1* | 2/2011 | Sugawara et al. ........ | 370/312 |
| 2011/0090856 A1* | 4/2011 | Cho et al. .............. | 370/329 |
| 2011/0116455 A1* | 5/2011 | Damnjanovic et al. ... | 370/329 |
| 2011/0222428 A1* | 9/2011 | Charbit et al. .......... | 370/252 |
| 2011/0274077 A1* | 11/2011 | Yamada et al. .......... | 370/329 |
| 2012/0063373 A1* | 3/2012 | Chincholi et al. ....... | 370/281 |
| 2012/0147813 A1* | 6/2012 | Visotsky et al. ......... | 370/328 |
| 2012/0182949 A1* | 7/2012 | Aiba et al. .............. | 370/329 |
| 2012/0294269 A1* | 11/2012 | Yamada et al. .......... | 370/329 |

OTHER PUBLICATIONS

Written Opinion of the International Searching Authority dated Dec. 26, 2012 in connection with International Patent Application No. PCT/KR2012/004771.

Extended European Search Report dated Apr. 29, 2015 in connection with European Patent Application No. 12800684.8; 12 pages.

Zhouyue Pi, et al; System Design and Network Architecture for a Millimeter-wave Mobile Broadband (MMB) System; IEEE; XP 031993489; May 3, 2011; 6 pages.

3GPP TS 36.300 V10.3.0;Evolved Universal Terrestrial Radio Access (E-UTRA) and Evolved Universal Terrestrial Radio Access Network (EUTRAN); Stage 2, Release 10; 197 pgs.

IEEE Standard for Local and metropolitan area networks; Part 16: Air Interface for Broadband Wireless Access Systems; May 29, 2009; IEEE Std 802.16th-2009; 2,017 pgs.

Standard ECMA-387 "High Rate 60 GHz PHY, MAC and PALs"; 2nd Edition Dec. 2010; 302 pgs.

Text of the First Office Action dated Mar. 1. 2016 in connection with Chinese Patent Application No. 201280039983.9; 15 pages.

Second Office Action, Chinese Patent Application No. 201280039983.9, Nov. 22, 2016, 15 pages, publisher The State Intellectual Property Office of the People's Republic of China, Shanghai, China.

* cited by examiner

APPARATUS AND METHOD FOR SUPPORTING NETWORK ENTRY IN A MILLIMETER-WAVE MOBILE BROADBAND COMMUNICATION SYSTEM

CROSS-REFERENCE TO RELATED APPLICATION(S) AND CLAIM OF PRIORITY

The present application is related to U.S. Provisional Patent Application No. 61/498,380, filed Jun. 17, 2011, titled "METHODS AND APPARATUS TO SUPPORT NETWORK ENTRY IN MILLIMETER WAVE WIDEBAND COMMUNICATIONS." Provisional Patent Application No. 61/498,380 is assigned to the assignee of the present application and is hereby incorporated by reference into the present application as if fully set forth herein. The present application hereby claims priority under 35 U.S.C. §119(e) to U.S. Provisional Patent Application No. 61/498,380.

TECHNICAL FIELD

The present application relates generally to wireless communications and, more specifically, to an apparatus and method for supporting network entry in a millimeter-wave mobile broadband communication system.

BACKGROUND

The demand for wireless data traffic is explosively increasing due to increasing popularity of smart phones and other mobile data devices, such as tablets, netbooks and eBook readers, among consumers and businesses. In order to meet the high growth in mobile data traffic, improvements in radio interface efficiency and allocation of new spectrum are useful.

SUMMARY

This disclosure provides a method and apparatus for supporting network entry of a mobile station in a communication system.

In one embodiment, a method for a base station to support network entry of a mobile station in a communication system is provided. The method includes transmitting to the mobile station each of a plurality of transmitted network entry signals over a preferred downlink beam corresponding to the transmitted network entry signal. Each of a plurality of received network entry signals is received from the mobile station over a preferred uplink beam corresponding to the received network entry signal. Each of the transmitted network entry signals includes the preferred uplink beam corresponding to a subsequently received network entry signal, and each of the received network entry signals includes the preferred downlink beam corresponding to a subsequently transmitted network entry signal.

In another embodiment, a base station configured to support network entry of a mobile station in a communication system is provided. The base station includes at least one cell, and the cell includes at least one antenna array. The antenna array is configured to transmit downlink control channels over multiple downlink beams and to receive from the mobile station over multiple uplink beams an initial network entry signal comprising an indication of a preferred one of the downlink beams. The antenna array is also configured, for each subsequently transmitted network entry signal, to transmit to the mobile station the transmitted network entry signal over the preferred downlink beam as indicated in a most recently received network entry signal. The transmitted network entry signal includes an indication of a preferred one of the uplink beams. The antenna array is also configured, for each subsequently received network entry signal, to receive from the mobile station the received network entry signal over the preferred uplink beam as indicated in a most recently transmitted network entry signal. The received network entry signal includes an indication of a preferred one of the downlink beams.

In yet another embodiment, a method for network entry of a mobile station in a communication system is provided. The method includes receiving from a base station each of a plurality of received network entry signals over a preferred downlink beam corresponding to the received network entry signal. Each of a plurality of transmitted network entry signals is transmitted to the base station over a preferred uplink beam corresponding to the transmitted network entry signal. Each of the received network entry signals includes the preferred uplink beam corresponding to a subsequently transmitted network entry signal, and each of the transmitted network entry signals includes the preferred downlink beam corresponding to a subsequently received network entry signal.

In still another embodiment, a mobile station configured to perform network entry in a communication system is provided. The mobile station includes an antenna and a main processor. The antenna is configured to receive from a base station downlink control channels over multiple downlink beams and subsequently received network entry signals over a preferred downlink beam. Each subsequently received network entry signal includes an indication of a corresponding preferred uplink beam. The main processor is configured to interpret the downlink control channels and subsequently received network entry signals, to generate an initial network entry signal based on the downlink control channels, to generate a subsequently transmitted network entry signal based on each subsequently received network entry signal, and to determine a preferred one of the downlink beams based on the downlink control channels and subsequently based on each subsequently received network entry signal. The initial network entry signal and each subsequently transmitted network entry signal includes an indication of the corresponding preferred downlink beam. The antenna is also configured to transmit to the base station the initial network entry signal over multiple uplink beams and each subsequently transmitted network entry signal, over a corresponding preferred uplink beam.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
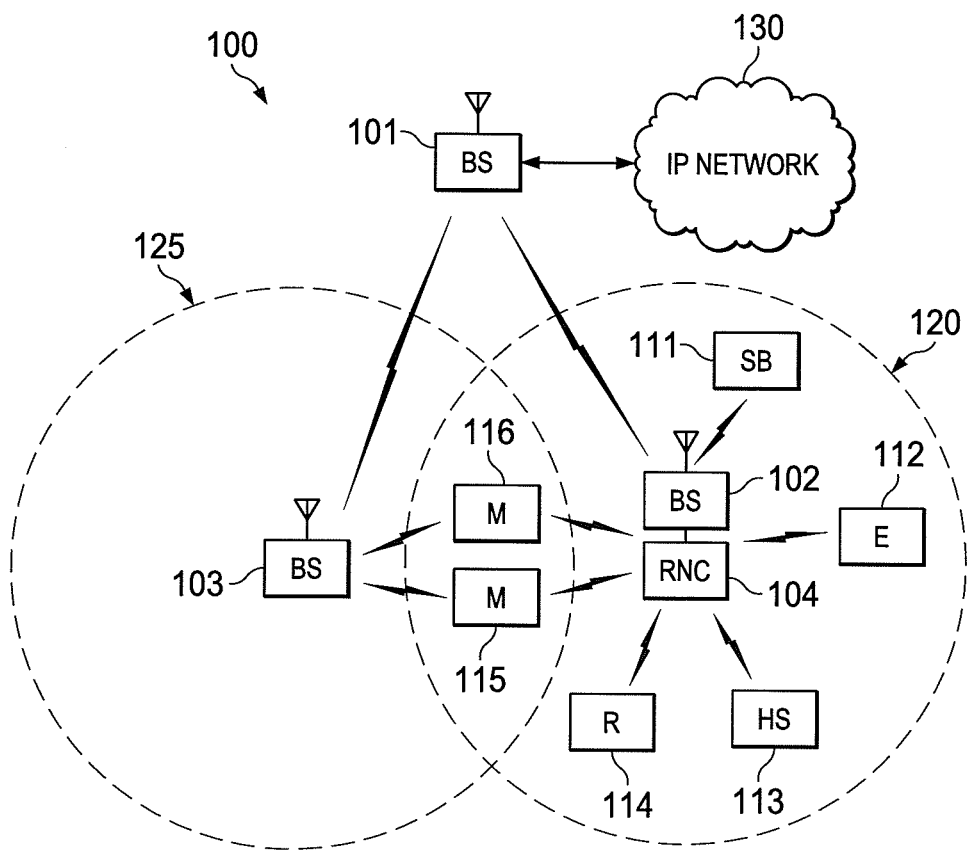
FIG. 1 illustrates a wireless network according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Currently-implemented 4G systems including Long Term Evolution (LTE) and Mobile Worldwide Interoperability for Microwave Access (WiMAX) use advanced technologies, such as Orthogonal Frequency Division Multiplexing (OFDM), Multiple Input/Multiple Output (MIMO), multi-user diversity, link adaptation, and the like, in order to achieve spectral efficiencies that are close to theoretical limits in terms of bps/Hz/cell. Continuous improvements in air-interface performance are being considered by introducing new techniques, such as carrier aggregation, higher order MIMO, coordinated Multipoint (CoMP) transmission and relays, and the like. However, it is generally agreed that any further improvements in spectral efficiency may only be marginal even in the best case.

When spectral efficiency in terms of bps/Hz/cell cannot be improved significantly, another possibility to increase capacity is to deploy many smaller cells. However, the number of small cells that can be deployed in a geographical area may be limited due to costs involved for acquiring new sites, installing equipment and provisioning backhaul. Also, to achieve an increase in capacity by a specified factor, the number of cells implemented is theoretically increased by the same specified factor. Another drawback of very small cells is frequent handoffs, which increase network signaling overhead and latency. Thus, while smaller cells may be useful for improved wireless networks, simply implementing smaller cells is not expected to meet the capacity required to accommodate the anticipated orders-of-magnitude increase in mobile data traffic demand in a cost-effective manner.

Therefore, in order to meet the explosive demand of mobile data, Millimeter-wave band (3-300 GHz spectrum) for Mobile Broadband (MMB) applications with wide area coverage may be implemented. Key advantages for these frequencies are spectrum availability and small sizes of components, such as antennas and other radio devices, due to short wavelengths. Because of their smaller wave lengths, more antennas can be packed in a relatively small area, thus enabling high-gain antenna in small form factor. Larger band can be used and much higher throughput can be achieved using MMB communications as compared to the current 4G system.

In current cellular systems, a mobile station (MS) can detect a base station (BS) using omni-receiving antennas and can send its information to the BS using omni-transmitting antennas or antennas with a very wide beam. These allow the MS to listen more easily to the downlink control channel from the BS and to detect the BS. Also, these allow the MS to send information to the BS more easily during a random access procedure (also referred to as a ranging procedure).

However, in future cellular systems with directional antennas or antenna arrays, such as an MMB cellular system, one of the challenges is how a mobile station can detect base stations and establish communications to get into the network. One of the reasons that it is challenging is that a base station can send its downlink control channel, such as synchronization channel and broadcast channel, in directional beams, while the mobile station may also receive and send information in directional beams. This makes it more difficult for a mobile station to discover base stations and try to randomly access the network.

With regard to the following description, it is noted that the LTE terms "node B," "enhanced node B," and "eNodeB" are other terms for "base station" used below. A base station as described herein may have a globally unique identifier, known as a base station identifier (BSID). For some embodiments, the BSID may be a MAC ID. Also, a base station can have multiple cells (e.g., one sector can be one cell), each with a physical cell identifier, or a preamble sequence, which may be carried in a synchronization channel. In addition, the LTE term "user equipment" or "UE" is another term for "subscriber station" used below, and a "mobile station" as described herein is interchangeable with a "subscriber station."

FIG. 1 illustrates an exemplary wireless network 100 according to one embodiment of the present disclosure. In the illustrated embodiment, the wireless network 100 includes base station (BS) 101, base station 102, and base station 103. Base station 101 communicates with base station 102 and base station 103. Base station 101 also communicates with Internet protocol (IP) network 130, such as the Internet, a proprietary IP network, or other data network. Base station 102 communicates with a Radio Network Controller (RNC) 104. In certain embodiments, the RNC 104 may be a part of base station 102. In certain embodiments, base station 101 and base station 103 may also communicate with the RNC 104. In other embodiments, base station 101 and base station 103 may include, or be in communication with, another radio network controller similar to the RNC 104. Base station 102 or base station 103 may communicate with IP network 130 using wireline, instead of communicating with base station 101 wirelessly.

Base station 102, either in cooperation with the RNC 104 or through the RNC 104, provides wireless broadband access to the network 130 to a first plurality of subscriber stations within a coverage area 120 of base station 102. The first plurality of subscriber stations includes subscriber station (SS) 111, subscriber station 112, subscriber station 113, subscriber station 114, subscriber station 115 and subscriber station 116. Subscriber stations 111-116 may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, and SS 115 and SS 116 may be mobile devices.

Base station 103 provides wireless broadband access to the network 130, via base station 101, to a second plurality of subscriber stations within a coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that the wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

Although FIG. 1 depicts one example of a wireless network 100, various changes may be made to FIG. 1. For example, another type of data network, such as a wired network, may be substituted for the wireless network 100. In a wired network, network terminals may replace BS's 101-103 and SS's 111-116. Wired connections may replace the wireless connections depicted in FIG. 1.

Figure 2:
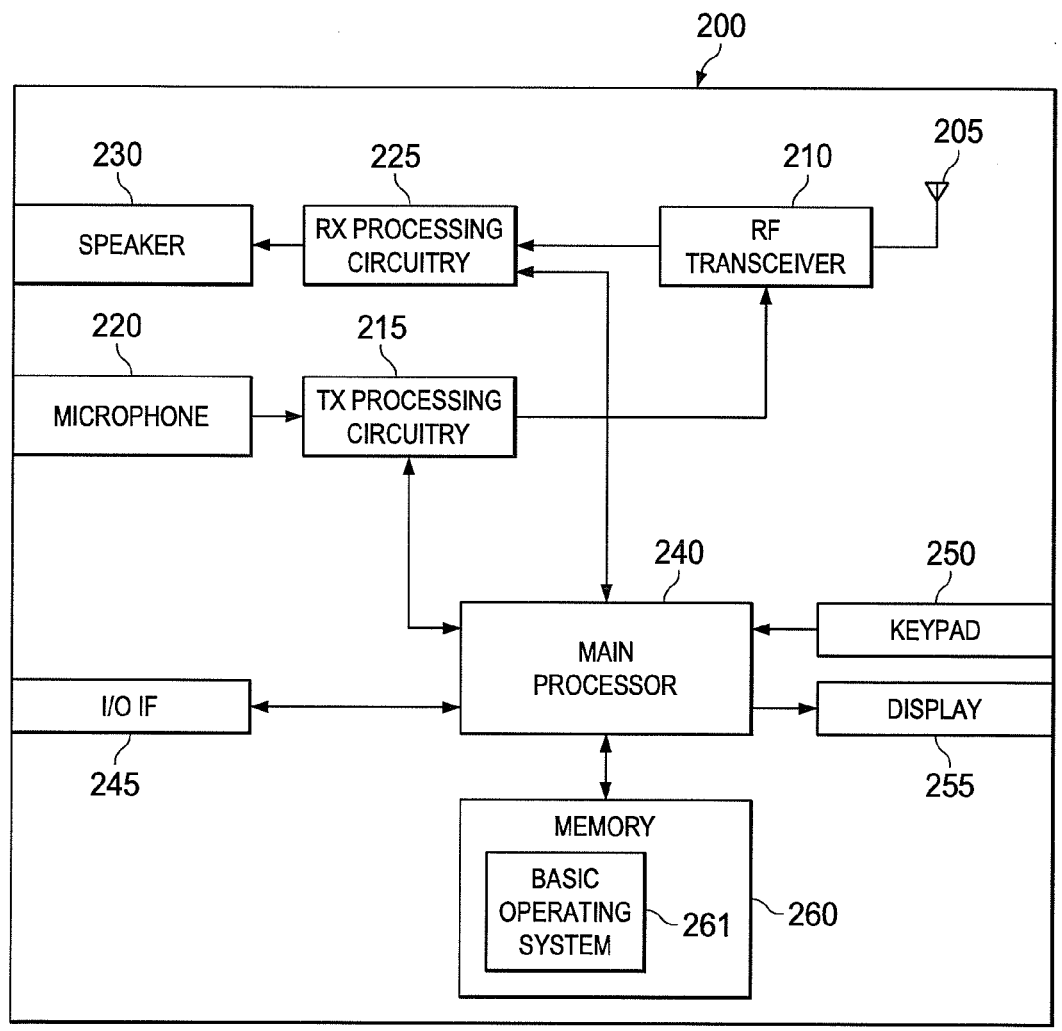
FIG. 2 illustrates a wireless mobile station according to an embodiment of the disclosure.

FIG. 2 illustrates a wireless mobile station 200 according to embodiments of the present disclosure. In certain embodiments, the wireless mobile station 200 may represent any of the subscriber stations 111-116 shown in FIG. 1. The embodiment of the wireless mobile station 200 illustrated in FIG. 2 is for illustration only. Other embodiments of the wireless mobile station 200 could be used without departing from the scope of this disclosure.

The wireless mobile station 200 comprises an antenna 205, a radio frequency (RF) transceiver 210, transmit (TX) processing circuitry 215, a microphone 220, receive (RX) processing circuitry 225 and a speaker 230. The mobile station 200 also comprises a main processor 240, an input/output (I/O) interface (IF) 245, a keypad 250, a display 255 and a memory 260.

The RF transceiver 210 receives from the antenna 205 an incoming RF signal transmitted by a base station of the wireless network 100. The RF transceiver 210 down-converts the incoming RF signal to produce an intermediate frequency (IF) or a baseband signal. The IF or baseband signal is sent to the RX processing circuitry 225 that produces a processed baseband signal by filtering, decoding and/or digitizing the baseband or IF signal. The RX processing circuitry 225 transmits the processed baseband signal to the speaker 230 (i.e., voice data) or to the main processor 240 for further processing (e.g., web browsing).

The TX processing circuitry 215 receives analog or digital voice data from the microphone 220 or other outgoing baseband data (e.g., web data, e-mail, interactive video game data) from the main processor 240. The TX processing circuitry 215 encodes, multiplexes and/or digitizes the outgoing baseband data to produce a processed baseband or IF signal. The RF transceiver 210 receives the outgoing processed baseband or IF signal from the TX processing circuitry 215. The RF transceiver 210 up-converts the baseband or IF signal to a RF signal that is transmitted via the antenna 205.

In some embodiments of the present disclosure, the main processor 240 is a microprocessor or microcontroller. The memory 260 is coupled to the main processor 240. The memory 260 can be any computer-readable medium. For example, the memory 260 can be any electronic, magnetic, electromagnetic, optical, electro-optical, electro-mechanical and/or other physical device that can contain, store, communicate, propagate, or transmit a computer program, software, firmware, or data for use by the microprocessor or other computer-related system or method. According to such embodiments, part of the memory 260 comprises a random access memory (RAM) and another part of the memory 260 comprises a Flash memory, which acts as a read-only memory (ROM).

The main processor 240 executes a basic operating system program 261 stored in the memory 260 in order to control the overall operation of the mobile station 200. In one such operation, the main processor 240 controls the reception of forward channel signals and the transmission of reverse channel signals by the RF transceiver 210, the RX processing circuitry 225, and the TX processing circuitry 215, in accordance with well-known principles.

The main processor 240 is capable of executing other processes and programs resident in the memory 260. The main processor 240 can move data into or out of the memory 260, as required by an executing process. The main processor 240 can move data into or out of the memory 260, as required by an executing process. The main processor 240 is also coupled to the I/O interface 245. The I/O interface 245 provides the mobile station 200 with the ability to connect to other devices such as laptop computers and handheld computers. The I/O interface 245 is the communication path between these accessories and the main controller 240.

The main processor 240 is also coupled to the keypad 250 and the display unit 255. The operator of the mobile station 200 uses the keypad 250 to enter data into the mobile station 200. The display 255 may be a liquid crystal or light emitting diode (LED) display capable of rendering text and/or graphics from web sites. Alternate embodiments may use other types of displays. For example, for an embodiment in which the display 255 is a touch-screen display, the keypad 250 may be provided via the display 255.

For some embodiments, as described in more detail below, the antenna 205 is configured to receive downlink control channels from a base station over multiple downlink beams and subsequently received network entry signals over a preferred downlink beam. Each subsequently received network entry signal includes an indication of a corresponding preferred uplink beam. For these embodiments, the main processor 240 is configured to interpret the downlink control channels and subsequently received network entry signals, to generate an initial network entry signal based on the downlink control channels, to generate a subsequently transmitted network entry signal based on each subsequently received network entry signal, and to determine a preferred one of the downlink beams based on the downlink control channels and subsequently based on each subsequently received network entry signal. The initial network entry signal and each subsequently transmitted network entry signal include an indication of the corresponding preferred downlink beam. The antenna 205 is also configured to transmit to the base station the initial network entry signal over multiple uplink beams and each subsequently transmitted network entry signal over a preferred uplink beam.

Although FIG. 2 depicts one example of a mobile station 200, various changes may be made to FIG. 2. For example, a wired or wireless network terminal may be substituted for the mobile device 200. A wired network terminal may or may not include components for wireless communication, such as an antenna.

Figure 3:
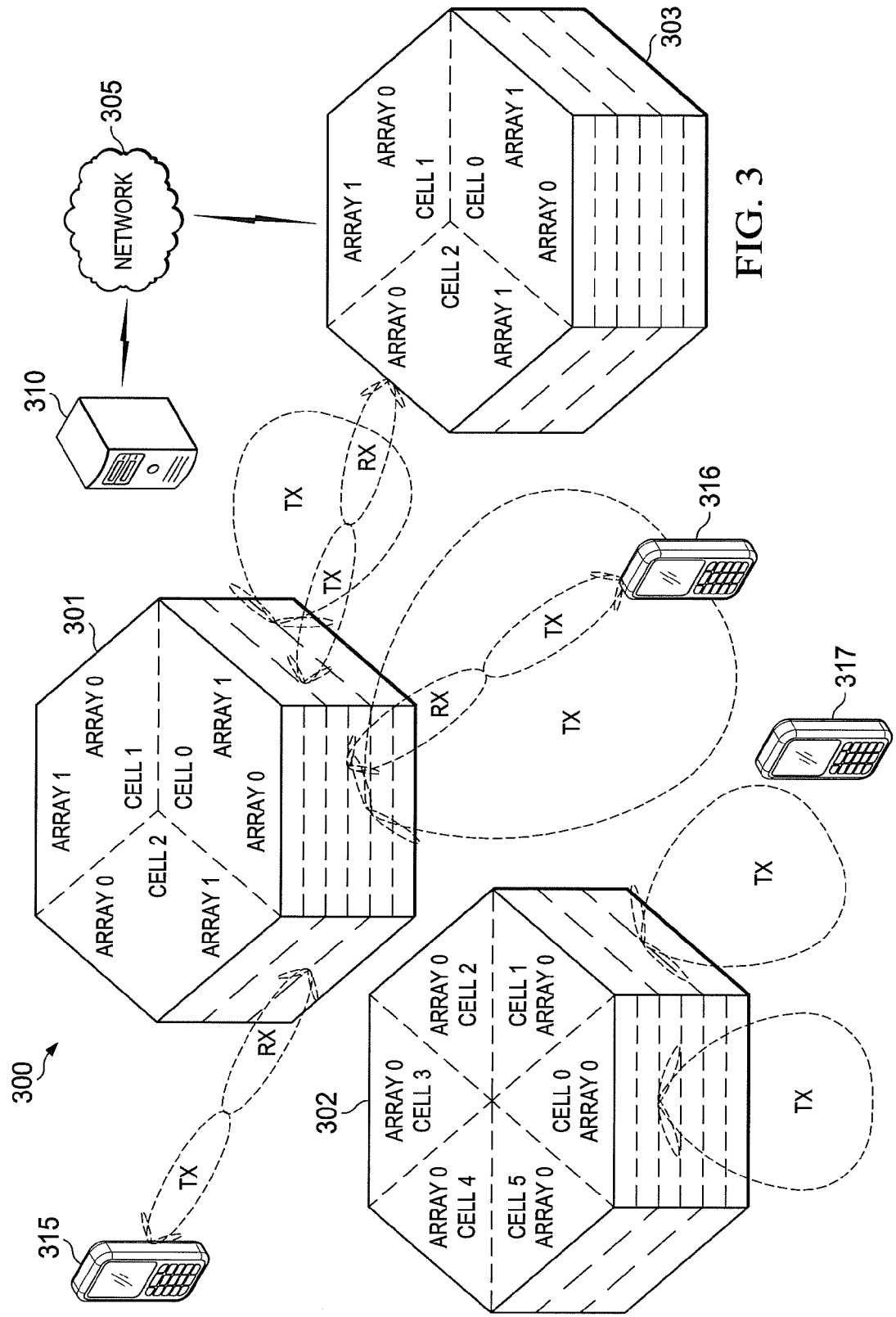
FIG. 3 illustrates a millimeter-wave mobile broadband (MMB) communication system according to an embodiment of the disclosure.

FIG. 3 illustrates a millimeter-wave mobile broadband (MMB) communication system 300 according to an embodiment of the disclosure. In the illustrated embodiment, the system 300 includes base station 301, base station 302, and base station 303.

Base station 301 is configured to communicate with base station 303 and with mobile stations 315 and 316. Base station 302 is configured to communicate with mobile station 317. Base station 303 is configured to communicate with a network 305, which provides access to a packet data server gateway 310. Both base station 301 and base station 303 comprise three cells (cell 0, cell 1 and cell 2), with each cell comprising two arrays (array 0 and array 1). Base station 302 comprises six cells (cell 0, cell 1, cell 2, cell 3, cell 4 and cell 5), with each cell comprising one array (array 0).

It will be understood that this embodiment is for illustration only and that other embodiments of the system 300 could be implemented without departing from the scope of this disclosure. For example, the base stations 301-303 may each communicate with any other suitable base station and/or mobile station. In addition, it will be understood that the base stations 301-303 may each represent any of the base stations 101-103 shown in FIG. 1 and that the mobile stations 315-317 may each represent any of the subscriber stations 111-116 shown in FIG. 1 and/or the mobile station 200 shown in FIG. 2.

The embodiments in this disclosure can be also applied to base station-to-base station wireless communication and mobile station-to-mobile station wireless communication, and are not limited to the communications in-between base station and mobile station.

Throughout this disclosure, the beams (including TX beams and RX beams) can have various beamwidths or various shapes, including regular or irregular shapes, and are not limited by those shown in the figures.

Furthermore, although the system 300 is described in the context of communication with millimeter waves, the system 300 may be implemented using any other suitable communication medium, such as radio waves with frequencies of 3 GHz-30 GHz that exhibit properties similar to millimeter waves. In addition, the communication medium may comprise electromagnetic waves with terahertz frequencies or infrared light, visible light or other optical media.

As used herein, the term "cellular band" refers to frequencies around a few hundred megahertz to a few gigahertz and the term "millimeter-wave band" refers to frequencies around a few tens of gigahertz to a few hundred gigahertz. The radio waves in cellular bands may have less propagation loss and provide better coverage but may also use relatively large antennas. On the other hand, radio waves in millimeter-wave bands may suffer higher propagation loss but lend themselves well to high-gain antenna or antenna array design in a small form factor.

Millimeter waves are radio waves with wavelengths in the range of 1 mm-100 mm, which corresponds to radio frequencies of 3 GHz-300 GHz. According to the International Telecommunications Union (ITU), these frequencies are also referred to as the EHF (Extremely High Frequency) band. These radio waves exhibit unique propagation characteristics. For example, compared with lower frequency radio waves, they suffer higher propagation loss, have poorer ability to penetrate objects, such as buildings, walls and foliage, and are more susceptible to atmosphere absorption, deflection and diffraction due to particles (e.g., rain drops) in the air.

On the other hand, due to their smaller wave lengths, more antennas can be packed in a relatively small area, thus enabling high-gain antenna in a small form factor. In addition, due to the aforementioned deemed disadvantages, these radio waves have been less utilized than the lower frequency radio waves. This presents unique opportunities for new businesses to acquire the spectrum in this band at a lower cost. The ITU defines frequencies in the range of 3 GHz-30 GHz as SHF (Super High Frequency). The frequencies in the SHF band also exhibit behavior similar to radio waves in the EHF band (i.e., millimeter waves), such as large propagation loss and the possibility of implementing high-gain antennas in small form factors.

A vast amount of spectrum is available in the millimeter-wave band. Millimeter-wave band has been used, for example, in short range (within 10 meters) communications. However, the existing technologies in millimeter-wave band are not for commercial mobile communication in a wider coverage, so no commercial cellular system in millimeter-wave band currently exists. For the description below, mobile broadband communication systems deployed in 3 GHz-300 GHz frequencies are referred to as millimeter-wave mobile broadband (MMB) communication systems.

One system design approach is to leverage the existing technologies for mobile communication and utilize the millimeter-wave channel as additional spectrum for data communication. In this type of system, communication stations, including different types of mobile stations, base stations, and relay stations, communicate using both the cellular bands and the millimeter-wave bands. The cellular bands are typically in the frequency of a few hundred megahertz to a few gigahertz. Compared with millimeter waves, the radio waves in these frequencies suffer less propagation loss, can better penetrate obstacles, and are less sensitive to non-line-of-sight (NLOS) communication links or other impairments, such as absorption by oxygen, rain, and other particles in the air. Therefore, certain control channel signals may be transmitted via these cellular radio frequencies, while the millimeter waves may be utilized for high data rate communication.

Another system design approach is to have standalone mobile communications and control/data communications in the MMB system 300. A mobile station 315-317 can handover to an existing cellular system such as 4G, 3G, etc., in situations such as when the mobile station 315-317 is in a coverage hole in the MMB system 300 or the signal strength from the base stations 301-303 in the MMB system 300 is not strong enough.

In any case, the communications in the MMB system 300 will coexist with the current cellular systems such as 4G, 3G, etc. In addition, base stations 301-303 in the MMB system 300 can have different sizes, with overlay hierarchical network structure, where small cells can be overlaid by large cells.

For some embodiments, a base station 301-303 can have one or multiple cells, and each cell can have one or multiple antenna arrays. Also, each array within a cell can have an array-specific frame structure. For example, the arrays may have different uplink and downlink ratios in a time division duplex (TDD) system. This provides flexibility for wireless backhaul.

Multiple transmitting/receiving (TX/RX) chains can be applied in one array, in one cell, etc. One or multiple antenna arrays in a cell can have the same downlink control channel (e.g., synchronization channel, physical broadcast channel and/or the like) transmission, while the other channels, such as data channels or the like can be transmitted in a frame structure that is specific to each antenna array.

Base stations 301-303 and mobile stations 315-317 can each use antennas or antenna arrays to carry out beamforming. Antenna arrays can form beams with different widths, such as wide beam or narrow beam. Downlink control channels, broadcast signals/messages and/or broadcast data or control channels can be transmitted in wide beams. A wide beam may be provided by transmitting one wide beam at one time, a sweep of narrow beams at one time or at sequential times, or in any other suitable manner. Multicast and/or unicast data/control signals or messages can be sent in narrow beams.

Also, for some embodiments, the widths of the beams for each mobile station 315-317 may be determined based on the speed of the mobile station 315-317. For example, low-mobility mobile stations may use a narrower beam, while high-mobility mobile stations may use a wider beam or multiple narrow beams.

For some embodiments, identifiers of cells may be carried in the synchronization channel, and identifiers of arrays, beams and the like may be implicitly or explicitly carried in the downlink control channels. The identifiers may be transmitted using wide beams. By acquiring these channels, a mobile station 315-317 can detect the identifiers.

For the embodiment illustrated in FIG. 3, each of the antenna arrays (array 0 and array 1) in cell 0 of base station 301 transmits the same downlink control channels on a wide beam. However, array 0 can have a different frame structure from array 1. For example, array 0 can have uplink unicast communication with mobile station 316, while array 1 can have a downlink backhaul communication with array 0 in cell 2 of base station 303, which may have a wired backhaul connecting to the backhaul networks.

Although FIG. 3 illustrates one example of an MMB communication system 300, various changes may be made to FIG. 3. For example, the makeup and arrangement of the system 300 are for illustration only. Components could be added, omitted, combined, subdivided, or placed in any other suitable configuration according to particular needs.

Figure 4:
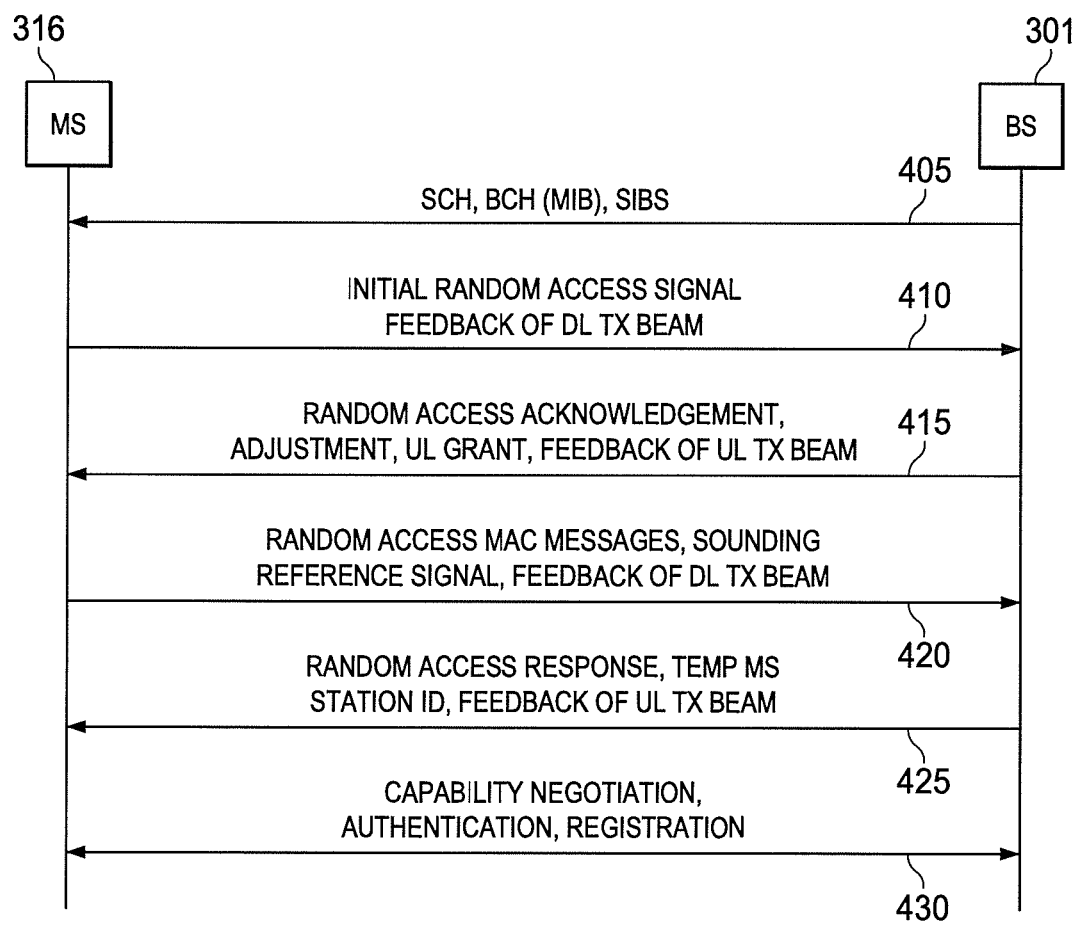
FIG. 4 illustrates a method for network entry of a mobile station in the MMB communication system of FIG. 3 according to an embodiment of the disclosure.

FIG. 4 illustrates a method for network entry of a mobile station 316 in the MMB communication system 300 according to an embodiment of the disclosure. The method shown in FIG. 4 is for illustration only. Network entry may be provided for the mobile station 316 in any other suitable manner without departing from the scope of this disclosure.

In initial network entry, downlink (DL) TX/RX beamforming and uplink (UL) TX/RX beamforming can be used. The mobile station 316 first acquires downlink control channels transmitted by the base station 301 (step 405). The downlink control channels include a synchronization channel (SCH), which can carry a physical cell identifier, etc., and a broadcast channel (BCH), which can carry system information. The BCH can include a physical broadcast channel (PBCH), which includes system information such as bandwidth, antenna array configuration, etc., and a dynamic broadcast channel, which can be transmitted as data packets. The dynamic broadcast channel can carry information such as an operator identifier, an initial random access configuration, etc. The DL control channel can be sent over beams by beamforming over one or multiple beams.

By acquiring the DL control channel from the base station 301, the mobile station 316 can identify a suitable DL beam. The mobile station 316 can also select a cell with which to be associated. The mobile station 316 also receives the initial random access configuration from the BCH of the selected cell.

The mobile station 316 can send an initial random access signal, which can include a preamble sequence, using a specified resource (the resource allocation can be in the BCH or derived from the information in the BCH that the mobile station 316 has already acquired) and can send feedback indicating the identified DL beam to the base station 301 (step 410). The mobile station 316 can send the signal using UL beamforming over one or multiple beams.

Upon receiving the initial random access signal and the feedback, the base station 301 can send a random access acknowledge signal using a specified resource (the resource allocation can be in the BCH or derived from the information in the BCH that the mobile station 316 has already acquired) (step 415). In the acknowledge signal, the base station 301 can include any adjustment of timing, an uplink grant for a next random access message, and feedback related to the UL beam.

The mobile station 316 can send a random access request message to the base station 301 in the scheduled/allocated UL resource using the uplink beam identified in the feedback from the base station 301 (step 420). The random access message can also include additional feedback related to the DL beam. The mobile station 316 can also send a sounding reference signal over UL beams so that the base station 301 can monitor which UL beam is suitable (step 420).

The base station 301 can send a random access response message to the mobile station 316, which can include a temporary station identifier of the mobile station 316 and feedback related to the UL beam (step 425).

The mobile station 316 can then use the temporary station identifier to communicate with the base station 301 (step 430). Capability negotiation, authentication, etc., and registration can follow with additional communication between the base station 301 and the mobile station 316 using beamforming.

In this way, a mobile station's 316 random access to the network in a system 300 with directional antennas or antenna arrays is efficiently and reliably supported. Each of the steps may implement beamforming, and steps 410, 415, 420, 425 and/or 430 may provide beamforming feedback for maintaining or improving communication between the mobile station 316 and the base station 301 through beamforming. Also, the procedure described above can provide good coverage, efficiency, and reliability. The steps in the method of FIG. 4 can be combined with other steps in initial network entry, network re-entry, etc.

Although FIG. 4 illustrates one example of a method for network entry of a mobile station 316 in the MMB communication system 300, various changes may be made to FIG. 4. For example, steps 415 and 420 may be repeated iteratively. Also, contention resolution and backoff may be carried out in steps 410 and 415, in steps 420 and 425, or in any other suitable steps or at any other suitable time.

Figure 5:
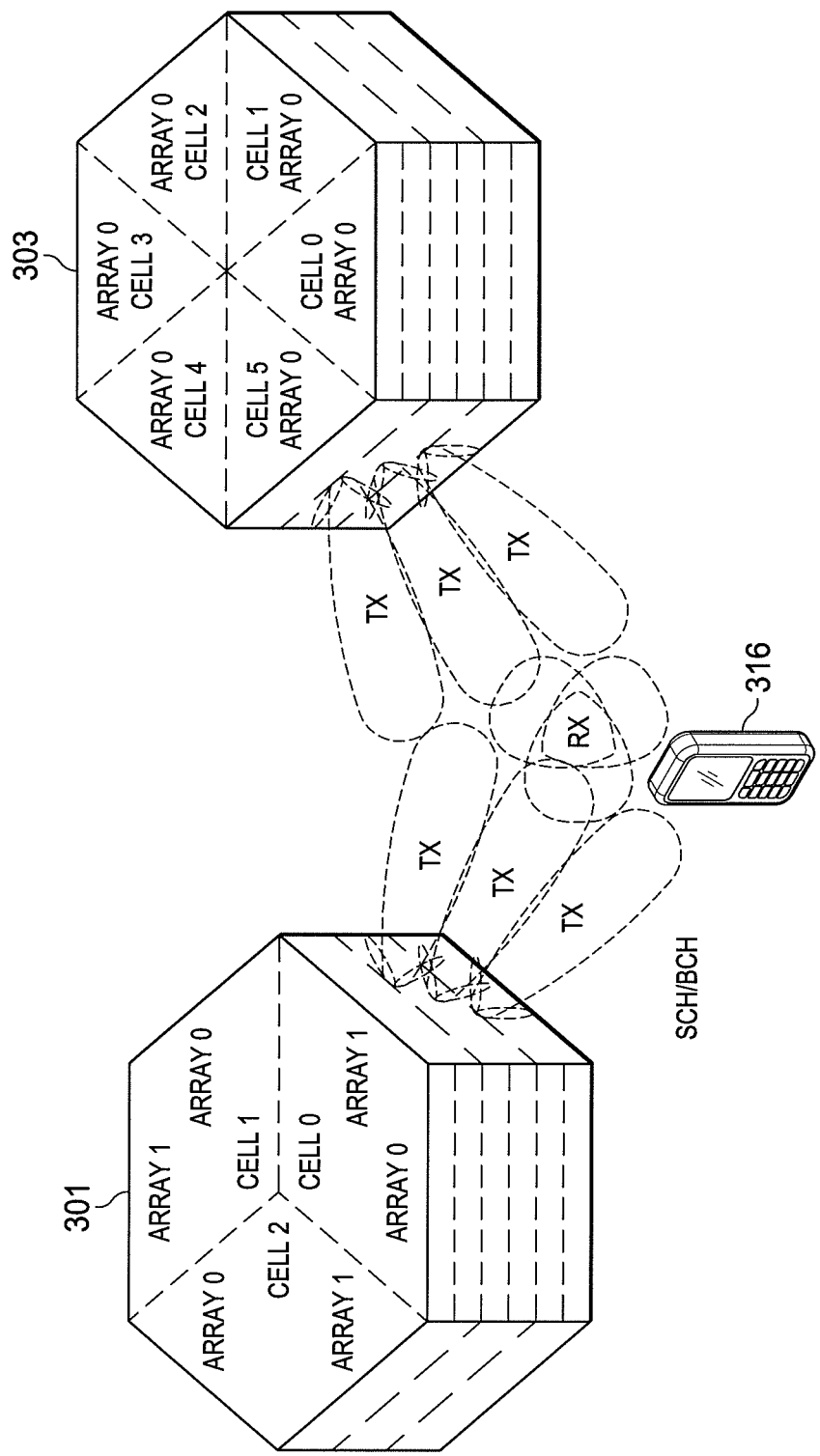
FIG. 5 illustrates signaling associated with the first step of the method of FIG. 4 according to an embodiment of the disclosure.

FIG. 5 illustrates signaling associated with step 405 of the method of FIG. 4 according to an embodiment of the disclosure. It will be understood that the embodiment of FIG. 5 is for illustration only and that signaling for step 405 could be implemented in any other suitable manner without departing from the scope of this disclosure.

As described above in connection with FIG. 4, the mobile station 316 acquires downlink control channels for the base station 301 in step 405. By acquiring the DL control channel from the base station 301, the mobile station 316 can identify a suitable DL beam.

For the embodiment illustrated in FIG. 5, the mobile station 316 can detect the synchronization channel (SCH) and the broadcast channel (BCH) on a wide beam transmitted by the base station 301. As described above, a wide beam may be provided by transmitting one wide beam at one time, a sweep of narrow beams at one time or at sequential times, or in any other suitable manner. SCH and BCH can also be transmitted over multiple beams with a beamwidth not as wide as the widest TX beam from BS shown in FIG. 3. Each of these multiple beams for SCH or BCH may have a beamwidth wider than the beams for unicast data communication, which can be for the communication between the base station and a single mobile station.

For the illustrated embodiment, multiple beams can be used to transmit SCH/BCH from one array (i.e., array 1). The beams from each array may include an array identifier and a frame structure for that array. The beams may be identified via any suitable type of identification, such as time domain identification (different time), frequency domain identification (different frequency), code domain identification (different codes if a code/sequence is used, such as a code division multiple access (CDMA) type of identification), or the like. The mobile station 316 can perform measurements to identify a suitable one of the beams transmitted by the base station 301.

The mobile station 316 can detect a location of dynamic BCH, which is sent over the data/shared channel, and can detect some dynamic BCHs. For example, the mobile station 316 may be configured to detect system information block (SIB) 1, which may include an operator identifier, a cell identifier, a closed subscriber group identifier and/or the like, and may be configured to detect system information block 2, which may include an initial random access signal configuration, an initial random access UL power ramp and/or the like.

The mobile station 316 is also configured to select a cell (e.g., cell 0 in the illustrated embodiment) to be associated with the mobile station 316. The mobile station 316 can feedback a preferred DL beam identifier, a preferred array (among arrays in the targeted cell) and/or the like.

For the illustrated embodiment, the base station 301 (cell 0, array 1) and the base station 303 (cell 5, array 0) each transmit multiple beams for SCH/BCH. The mobile station 316 detects beams and performs measurements. The mobile station 316 can choose with which cell to associate based on those measurements and on information detected from SCH/BCH, such as cell barring information and/or the like. The mobile station 316 can use RX beamforming as well. The mobile station 316 can identify each beam and then feedback to the selected cell which DL beam is preferred by the mobile station 316.

Figure 6:
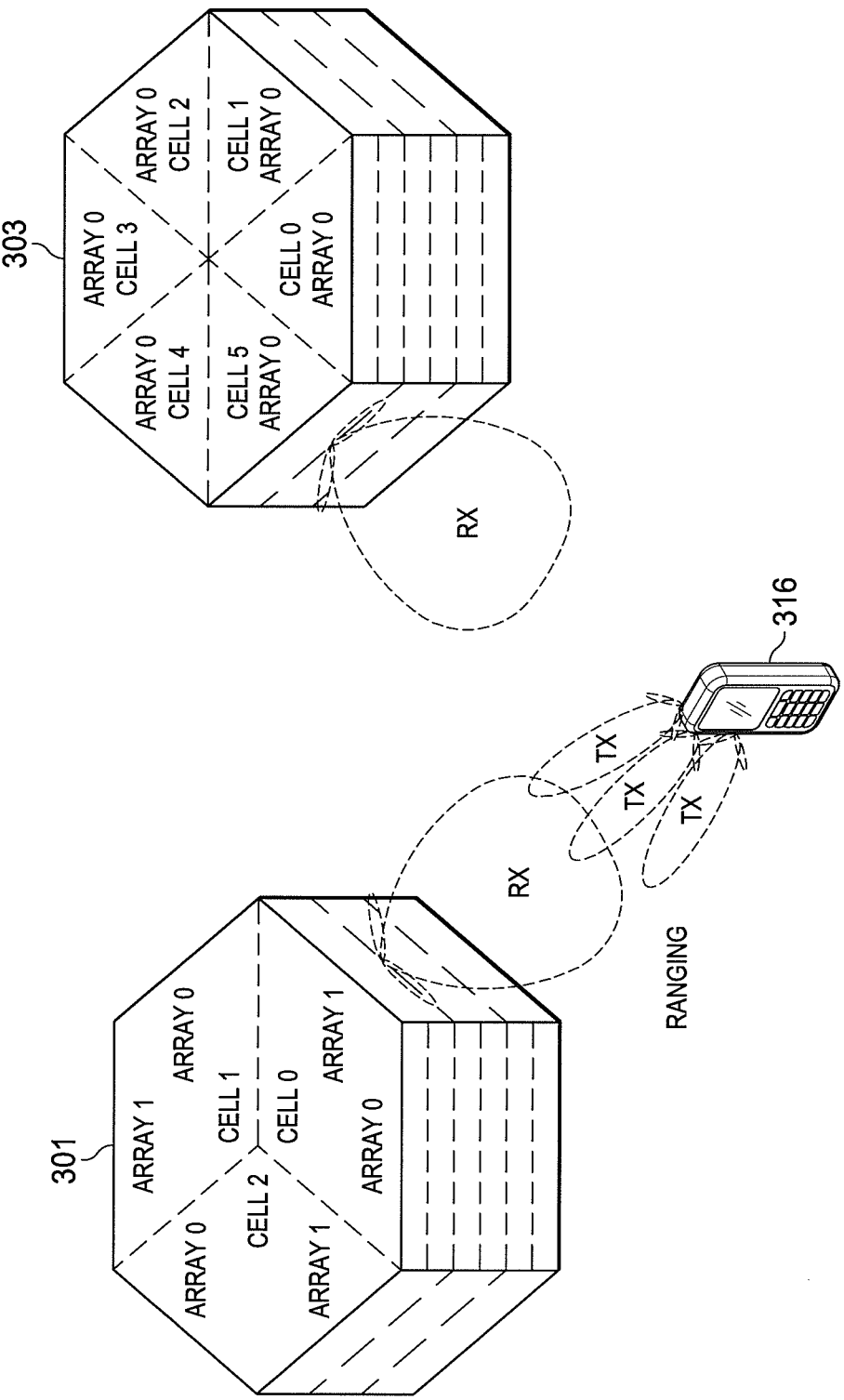
FIG. 6 illustrates signaling associated with the second step of the method of FIG. 4 according to an embodiment of the disclosure.

FIG. 6 illustrates signaling associated with step 410 of the method of FIG. 4 according to an embodiment of the disclosure. It will be understood that the embodiment of FIG. 6 is for illustration only and that signaling for step 410 could be implemented in any other suitable manner without departing from the scope of this disclosure.

The base station 301 can use one or multiple RX beams to receive the signal from the mobile station 316 and is not limited to the case that only one RX beam at the base station 301 is used as shown in FIG. 6. When the base station 301 uses multiple RX beams, it can form the RX beams at the same time (e.g., using multiple RF chains) or it can form the RX beams by steering. The same may apply to the RX beams in FIG. 8.

As described above in connection with FIG. 4, the mobile station 316 sends an initial random access signal using a specified resource and sends feedback indicating the identified DL beam to the base station 301 in step 410.

For the embodiment illustrated in FIG. 6, the mobile station 316 sends an initial ranging signal using UL beamforming, where the signal can be sent over one beam or multiple narrow beams. For the illustrated embodiment, the mobile station 316 sends the initial ranging signal using multiple beams.

The mobile station 316 sends the initial ranging signal, which can include a preamble sequence, at a certain resource allocation. The resource allocation can be identified in the BCH or derived by the mobile station 316 from the information in the BCH that the mobile station 316 has already acquired.

The initial ranging signal can include a preamble, feedback of a preferred DL TX array and beam and/or the like. The feedback may indicate the preferred array and/or beam by using an explicit indication or by using an implicit indication, such as partition of preambles, different resource allocations for preambles, or the like. The mobile station 316 can send the initial ranging signal using any suitable contention-based algorithm. For example, for some embodiments, the mobile station 316 may use a random backoff time.

The mobile station 316 can send its preferred array or beam to the base station 301. Throughout this disclosure, the preferred array or beam can mean one or multiple arrays or beams, for example, one preferred array or beam, or a list of arrays or beams, etc. The preferred arrays or beams can be arranged in some order, for example, by the degree of preference (such as the most preferred being first in the list, a second most preferred being second in the list, etc.).

The base station 301 can select one or multiple arrays or beams out of multiple DL TX arrays or beams for use. The base station 301 can then inform the mobile station 316 of the selection. In some cases, additional rounds of communication may be used for this purpose.

For a particular example, the base station 301 may use the first one in the received list to communicate with the mobile station 316 in order to notify the mobile station 316 which array and/or beam the base station 301 will use in a next round of communication. The mobile station 316 will try to receive the DL beam that is the first on the list sent by the mobile station 316 to the base station 301. Then if the mobile station 316 receives the message from the base station 301 where the message contains the one or multiple arrays or beams that the base station 301 has chosen to use for the next round of communication, the mobile station 316 would send a confirmation message back to the base station 301. The confirmation, for example, can be repeating the arrays or beams that the base station 301 has indicated. The confirmation message can also contain the arrays or beams that the mobile station 316 prefers, and more rounds of selecting DL TX arrays or beams can be carried out. The base station 301 can also use multiple DL TX arrays or beams to send the same information to the mobile station 316.

For some embodiments, the base station 301 may include a timer and, if a confirmation is not received after a certain period of time, the base station 301 would assume the mobile station 316 has not received the message including the array and/or beam that the base station 301 chose to use for the next round of communication. In this case, the base station 301 can stop sending the message or can continue using the current DL beam. Alternatively, the base station 301 can use multiple DL beams that include the current array and/or beam and a next array and/or beam chosen by the base station 301. Also, for these embodiments, the mobile station 316 may also include a timer. If the mobile station 316 does not receive a message from the base station 301 after a certain period of time, the mobile station 316 could abort the procedure and start over again.

It will be understood that other embodiments may also be implemented. For example, the base station 301 can use each array and/or beam in the list to send the mobile station 316 information, while the mobile station 316 monitors each of these TX instances to determine what information the base station 301 wants to send.

The base station 301 can also use multiple DL TX arrays or beams to send the same information to the mobile station 316 so that the mobile station 316 could have more chances to receive the information. The mobile station 316 can also use multiple TX arrays and/or beams to send the same information to the base station 301.

For some embodiments, an initial ranging signal can be designed, for example, by defining ranging preambles, a random backoff, a power adjustment and/or the like. For example, a ranging preamble can be defined for each beam. Also, a random backoff and a power adjustment can each be defined for each mobile station and/or for each beam. In addition, the mobile station 316 may select a power level to transmit the initial ranging signal. For example, the power level may be selected for each beam and power ramp parameters can be set in one of the dynamic BCHs detected.

Figure 7:
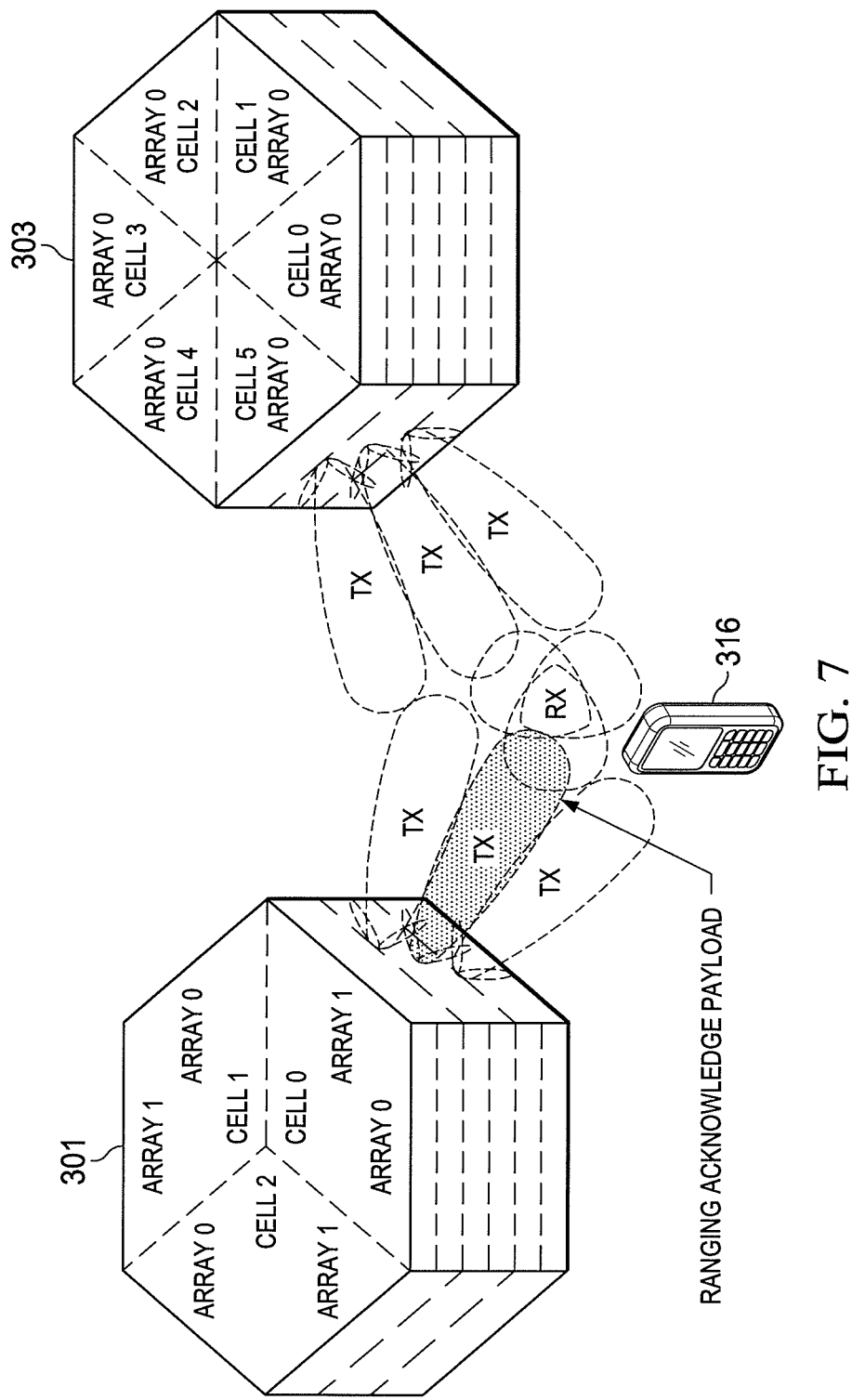
FIG. 7 illustrates signaling associated with the third step of the method of FIG. 4 according to an embodiment of the disclosure.

FIG. 7 illustrates signaling associated with step 415 of the method of FIG. 4 according to an embodiment of the disclosure. It will be understood that the embodiment of FIG. 7 is for illustration only and that signaling for step 415 could be implemented in any other suitable manner without departing from the scope of this disclosure.

As described above in connection with FIG. 4, the base station 301 sends a random access acknowledge signal, including feedback related to the UL beam, using a specified resource in step 415.

For the embodiment illustrated in FIG. 7, the base station 301 sends a random access (i.e., ranging) acknowledgment (ACK) signal using DL beamforming. The base station 301 can send the random access ACK signal over the mobile station's 316 preferred DL beam and/or array. The random access ACK signal can be sent in response to the initial ranging signal received from the mobile station 316. The random access ACK signal can include a detected preamble code, a timing adjustment, an UL grant for a next random access message, feedback of a preferred UL beam, sounding configuration and/or the like.

If a sounding configuration is predefined (before the mobile station 316 is assigned a temporary station identifier), such as in one of the dynamic BCHs, then the sounding configuration may not be included in the unicast ranging ACK.

Upon receiving the initial random access signal and the feedback, the base station 301 can send the random access ACK signal at a certain resource. For example, the resource allocation can be in the BCH or derived from the information in the BCH that the mobile station 316 has already acquired.

Figure 8:
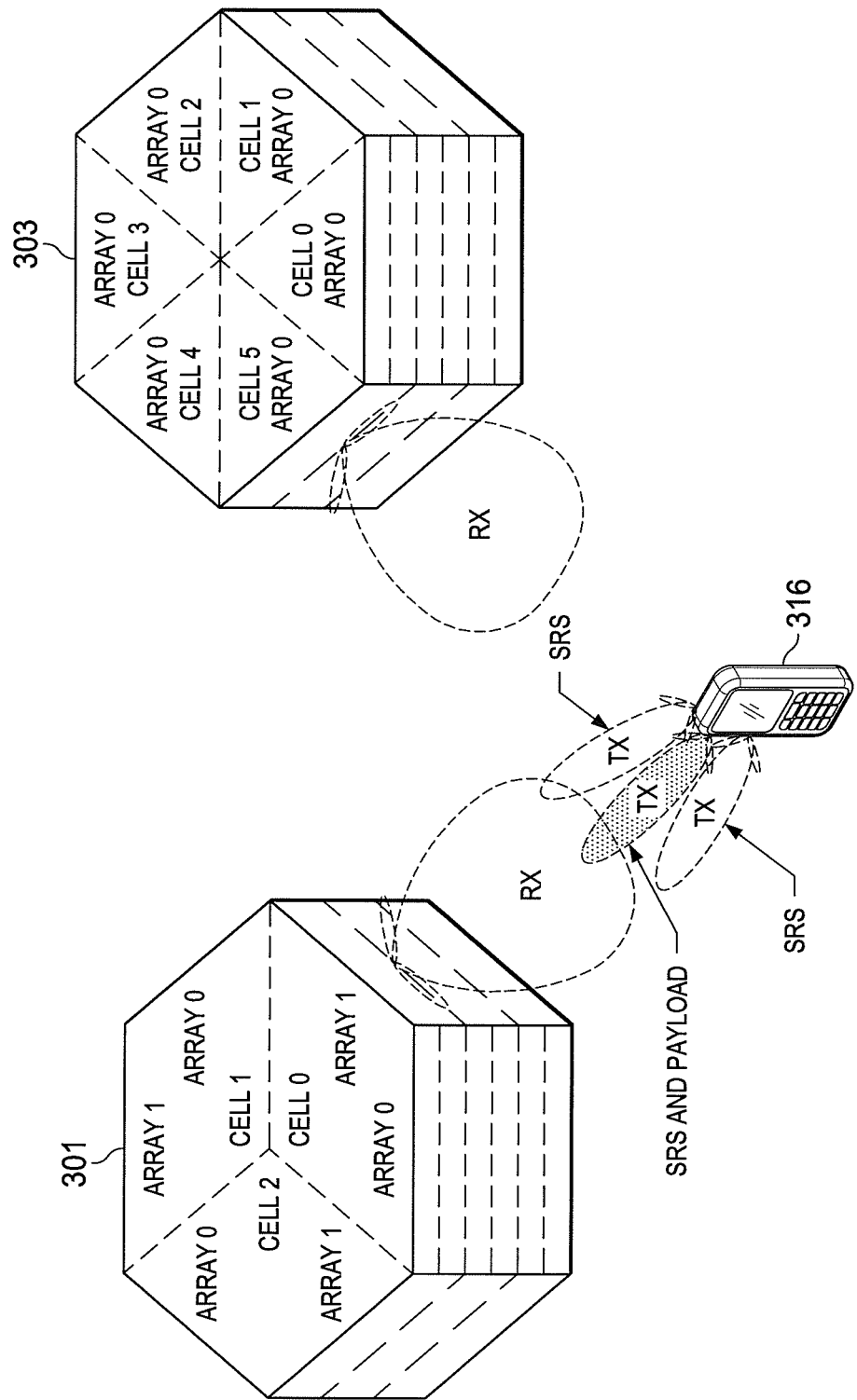
FIG. 8 illustrates signaling associated with the fourth step of the method of FIG. 4 according to an embodiment of the disclosure.

FIG. 8 illustrates signaling associated with step 420 of the method of FIG. 4 according to an embodiment of the disclosure. It will be understood that the embodiment of FIG. 8 is for illustration only and that signaling for step 420 could be implemented in any other suitable manner without departing from the scope of this disclosure.

As described above in connection with FIG. 4, the mobile station 316 sends a random access request message, including additional feedback related to the DL beam, to the base station 301 in the scheduled/allocated UL resource using the uplink beam identified in the feedback from the base station 301 in step 420. Also, the mobile station 316 sends a sounding reference signal over UL beams so that the base station 301 can monitor which UL beam is suitable in step 420.

For the embodiment illustrated in FIG. 8, the mobile station 316 sends a random access scheduled transmission using UL beamforming. The mobile station 316 can send the scheduled transmission payload over the base station's 301 preferred UL TX element, e.g., beam, array, RF chain, etc. The payload can include a ranging request MAC message payload, feedback of a preferred DL TX element (e.g., beam, array, RF chain, etc.) and/or the like.

The mobile station 316 can also send sounding reference signals as configured. For some embodiments, the mobile station 316 can send a sounding reference signal over each UL TX element. A sounding reference signal can be designed in any suitable manner. For example, the sounding reference signal can be preconfigured, broadcast, unicast, etc.

Figure 9A:
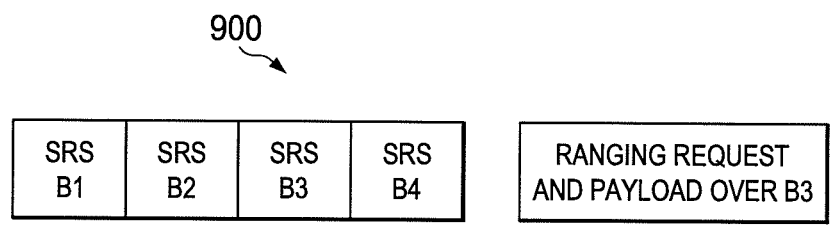
FIGS. 9A-B illustrate resource allocation for the sounding reference signals of FIG. 8 according to alternate embodiments of the disclosure.
Figure 9B:
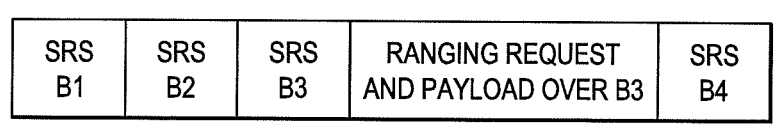

FIGS. 9A-B illustrate resource allocation for the sounding reference signals of FIG. 8 according to alternate embodiments of the disclosure. The embodiments of resource allocation illustrated in FIGS. 9A-B are for illustration only. Other embodiments of resource allocation for the sounding reference signals could be used without departing from the scope of this disclosure.

The mobile station 316 sends a sounding reference signal (SRS) during the random access procedure before the mobile station 316 receives a temporary station identifier or a cell radio network temporary identifier. The sounding reference signal is used by the base station 301 to measure and track UL beams of the mobile station 316.

The sounding reference signal can be a sequence or a code. Different sounding sequences can be used to distinguish between mobile stations. Sounding sequences may also be used to identify different beams.

Certain resources may be allocated for the sounding reference signal. The resources that the mobile station 316 uses to transmit the SRS can be configured by the base station 301. For this embodiment, the SRS is a scheduled transmission. The base station 301 can distinguish between mobile stations based on the SRS sequences, scheduling or the resources allocated to the mobile station 316 to transmit the SRS.

The power level for transmitting the sounding reference signal can be set in any suitable manner. For example, for some embodiments, the power level may be set to the same power level used for transmitting a ranging signal.

FIG. 9A shows a first example of the resource (e.g., time-frequency) allocation 900 for SRS and payload over beams, and FIG. 9B shows a second example of the resource allocation 950 for SRS and payload over beams. In both examples, each beam sends an SRS in some allocated resource (e.g., time-frequency block). For example, an SRS for beam 1 (SRS B1), an SRS for beam 2, an SRS for beam 3, and an SRS for beam 4 are each sent over a corresponding allocated resource. For beam 3, the mobile station 316 also sends a ranging request and payload.

In the example of FIG. 9A, the SRSs for each of the beams can be assigned to the resources adjacent to each other, while in the second example of FIG. 9B, the SRSs for each of the beams can be assigned to resources not necessarily adjacent to each other.

Figure 10:
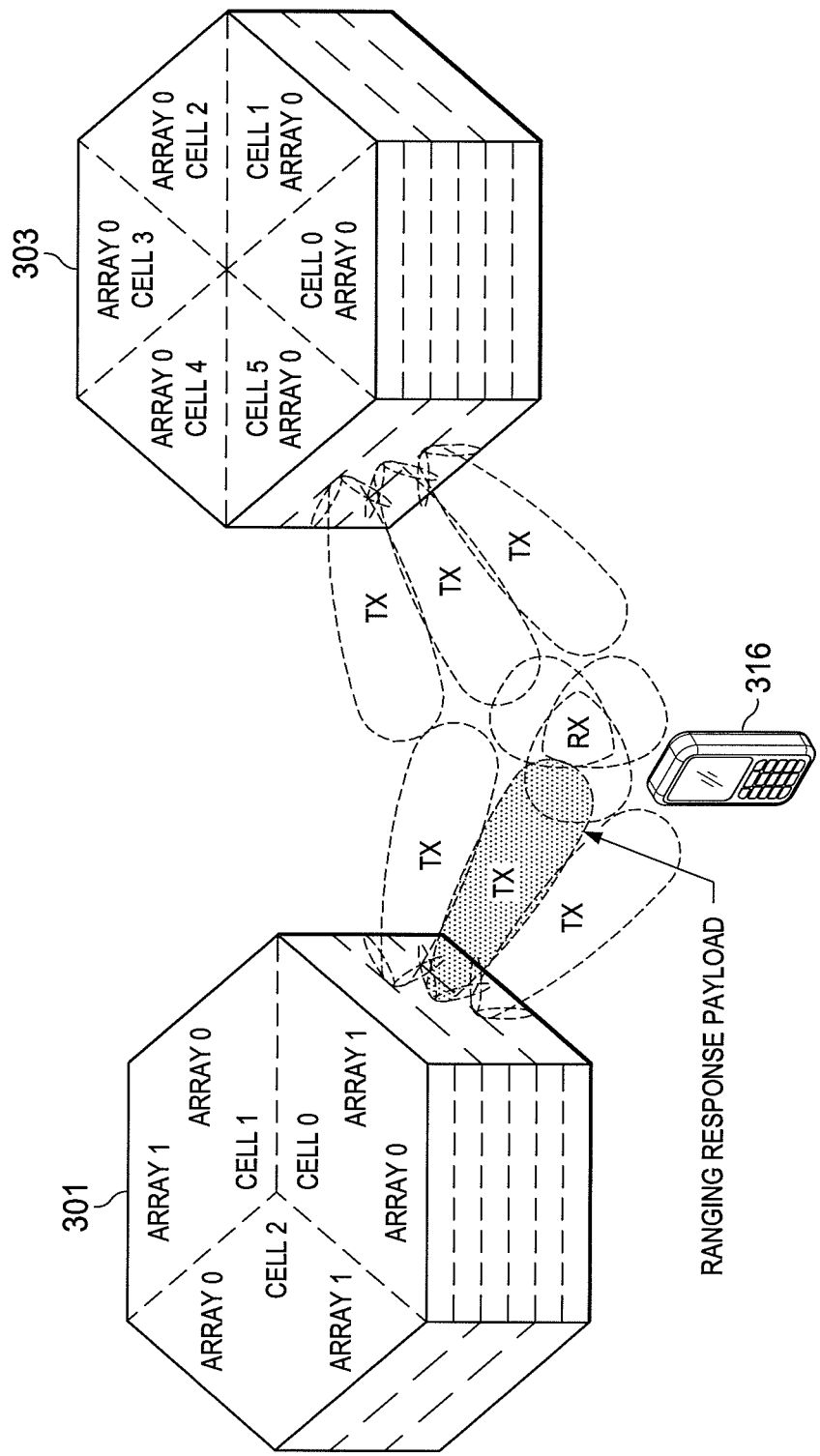
FIG. 10 illustrates signaling associated with the fifth step of the method of FIG. 4 according to an embodiment of the disclosure.

FIG. 10 illustrates signaling associated with step 425 of the method of FIG. 4 according to an embodiment of the disclosure. It will be understood that the embodiment of FIG. 10 is for illustration only and that signaling for step 425 could be implemented in any other suitable manner without departing from the scope of this disclosure.

As described above in connection with FIG. 4, the base station 301 sends a random access response message, which includes a temporary station identifier of the mobile station 316 and feedback related to the UL beam, to the mobile station 316 in step 425.

For the embodiment illustrated in FIG. 10, the base station 301 sends a random access response using DL beamforming. The base station 301 can send the random access response over the mobile station's 316 preferred DL beam and/or preferred array. The random access response can be sent in response to the random access request message received from the mobile station 316. The random access response can include a temporary station identifier assigned to the mobile station 316 and feedback of a preferred UL TX array or beam. After the mobile station 316 obtains the temporary station identifier, the mobile station 316 can implement normal data communication where the sounding will be as in a connected state.

Figure 11:
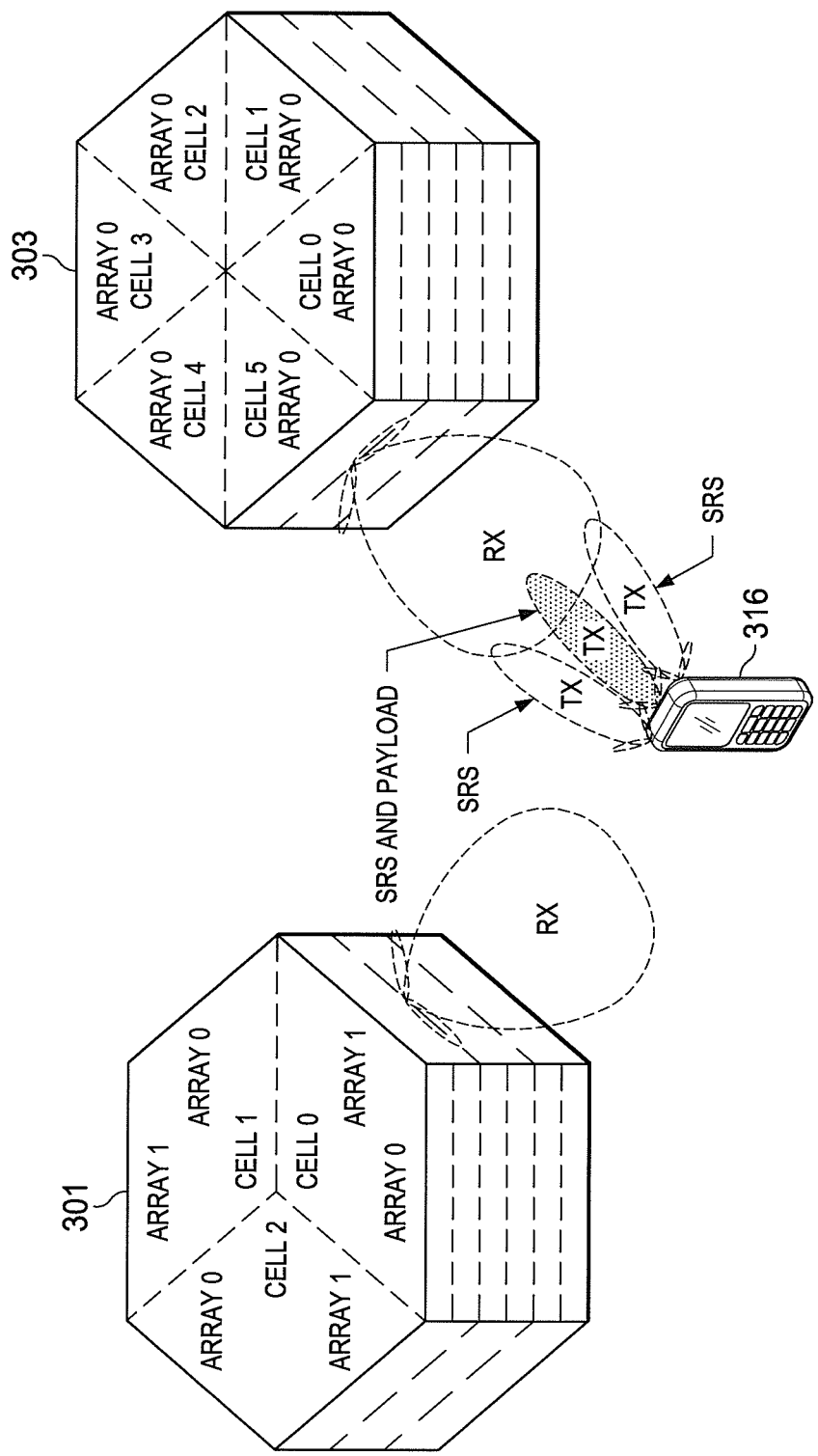
FIG. 11 illustrates a portion of a handover procedure for a mobile station in the MMB communication system of FIG. 3 according to an embodiment of the disclosure.

FIG. 11 illustrates a portion of a handover procedure for a mobile station 316 in the MMB communication system 300 according to an embodiment of the disclosure. It will be understood that the embodiment of FIG. 11 is for illustration only and that handover could be implemented in any other suitable manner without departing from the scope of this disclosure.

For the embodiment illustrated in FIG. 11, the mobile station 316 sends a random access transmission using UL beamforming during handover. The base station 301 is the serving base station, and the base station 303 is the target base station. The mobile station 316 sends an SRS and a payload on a beam that is estimated as a good beam (for a first communication) or on a preferred beam (for later communications) and sends SRSs on other beams. The base station 303 can perform measurements and inform the mobile station 316 which UL beam is the preferred one.

Thus, the mobile station 316 can use UL beamforming to perform network re-entry to a target base station 303 when the mobile station 316 is handed over from its serving base station 301 to the target base station 303. When a serving base station 301 hands over a mobile station 316 to a target base station 303, the serving base station 301 can instruct the mobile station 316 about the random access configuration, such as ranging opportunity, ranging preamble, etc., to range to the target base station 303.

When the mobile station 316 ranges to the target base station 303, for the mobile station's 316 first transmission to the target base station 303, the serving base station 301, the network 300 or the mobile station 316 can determine or estimate a preferred UL beam over which to transmit the ranging signal. The determination or estimation of which beam is the preferred UL beam can be based on any suitable information, such as system information, e.g., locations, measurements, etc.

Thus, for dedicated ranging during a handover procedure, the serving base station 301 may assign the ranging opportunity and the preamble for the mobile station 316. In this way, no contention resolution has to be performed. Also, for the mobile station's 316 first transmission to the target base station 303, the serving base station 301, the network 300 or the mobile station 316 can guess a best UL beam to transmit the ranging signal. For example, the guess may be based on locations, measurements, etc.

The mobile station 316 can send an SRS to the target base station 303 before a temporary MAC identifier is assigned. The mobile station 316 may send a first signal including SRSs over each UL beam and a payload over the guessed UL beam. Alternatively, the mobile station 316 may send the SRSs without sending a payload for the first signal.

The target base station 303 can feed back the identifier of a preferred UL beam for the target base station 303 to the mobile station 316 based on any suitable criteria. For example, the target base station 303 may identify one or multiple beams as a preferred UL beam based on the SRSs received from the mobile station 316.

The mobile station 316 can send additional signals that can include SRSs over each of the UL beams and a payload over a UL beam preferred by the target base station 303. The mobile station 316 can send SRSs to the target base station 303 before a temporary station identifier is assigned.

In this way, beamforming can be used in one or more steps, including in every step, in a random access procedure (e.g., initial random access, random access during handover, etc.). Beamforming feedback identifying a beam or beams as a preferred beam or beams for a next round of transmission can be used in the random access procedure. In addition, UL sounding can be transmitted by the mobile station 316 to assist UL beamforming before a temporary station identifier is assigned in random access.

Any of the steps in this disclosure can be combined with other steps or procedures. For example, they can be combined with contention resolution procedures. For this example, after a scheduled transmission from the mobile station 316 (e.g., the random access request MAC message from the mobile station 316), contention resolution can be used, where the base station 301 may send an additional message to help resolve contention. This additional message can be sent over the preferred DL TX arrays and/or beams, where the scheduled transmission from the mobile station 316 can contain the feedback of the preferred DL TX arrays and/or beams.

Throughout this disclosure, the preferred DL TX arrays and/or beams can be, for example, the DL TX arrays and/or beams of the preferred pairs of DL beams and RX beams, the DL TX arrays and/or beams of the pairs of DL beams and RX beams whose links have the strongest signals or best links, or DL TX arrays and/or beams that the mobile station 316 determines will provide good links, etc. In addition, it will be understood that references herein to a "preferred beam" can include any suitable combination of one or more beams and/or arrays.

Figure 12:
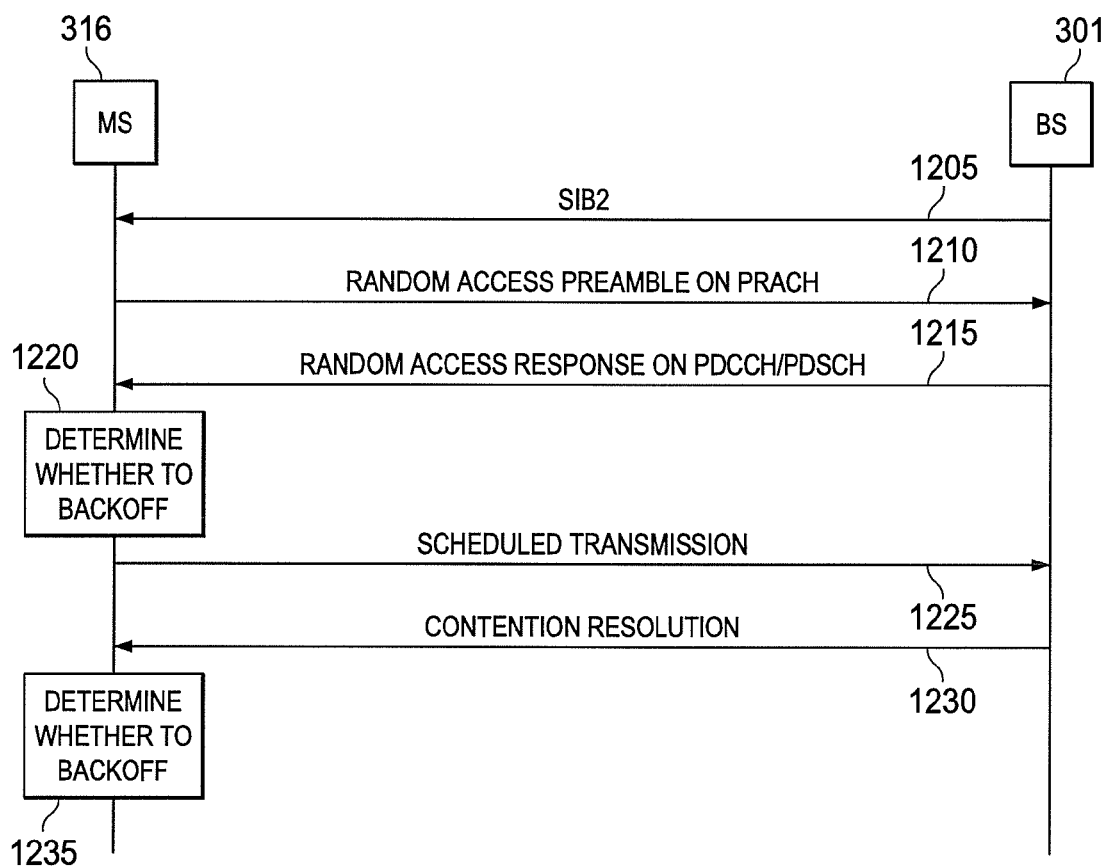
FIG. 12 illustrates a method for network entry of a mobile station in the MMB communication system of FIG. 3 implementing Long Term Evolution (LTE) or LTE-Advanced according to an embodiment of the disclosure.

FIG. 12 illustrates a method for network entry of a mobile station 316 in the MMB communication system 300 when the system 300 comprises massive antennas and implements Long Term Evolution (LTE) or LTE-Advanced according to an embodiment of the disclosure. The method shown in FIG. 12 is for illustration only. Network entry may be provided for the mobile station 316 in any other suitable manner without departing from the scope of this disclosure.

In initial network entry, DL TX/RX beamforming and UL TX/RX beamforming can be used. The base station 301 can send system information by beamforming over one or multiple beams (step 1205). The mobile station 316 may be configured to detect system information block (SIB) 2, which may include any suitable system information. For example, SIB2 may include physical random access channel (PRACH) parameters, such as channel configuration and preamble format; access parameters, such as access probability and access barring; power parameters, such as an initial target power, a power ramp step and a maximum number of attempts; preamble parameters, such as a root sequence index, a cyclic shift and a number of sequences; and/or a contention resolution timer.

The mobile station 316 can send a random access preamble on PRACH (step 1210). This signal may also include a random access radio network temporary identifier (RA-RNTI) and a subframe number. For some embodiments, the mobile station 316 may determine a power level for transmitting the preamble and transmit the preamble at the determined power level. The mobile station 316 can send the preamble using UL beamforming over multiple beams and can include feedback indicating a preferred DL beam to the base station 301.

The base station 301 can send a random access response on a physical downlink control channel (PDCCH)/physical downlink shared channel (PDSCH) using the preferred DL beam indicated by the mobile station 316 (step 1215). The PDCCH may include an address to a group of mobile stations with the RA-RNTI, and the PDSCH may include a MAC random access response. The signal may also include a backoff indicator or RA preamble identifier, a timing adjustment, an UL grant (such as a hopping indicator, a resource block assignment, coding and modulation, transmit power control, a UL delay, a CQI request and/or the like) and/or a temporary cell identifier (i.e., a C-RNTI). Also, the signal may include feedback indicating a preferred UL beam to the mobile station 316, in addition to an SRS configuration.

The mobile station 316 can determine whether to backoff (step 1220). For example, the mobile station 316 may backoff if its identifier does not match an identifier sent by the base station 301 in step 1215. Alternatively, the mobile station 316 may backoff if a backoff indicator is set in the signal sent by the base station 301 in step 1215. If the mobile station 316 backs off, the mobile station 316 may retry network entry after a specified period of time.

If the mobile station 316 does not backoff (step 1220), the mobile station 316 can send a scheduled transmission (step 1225). This signal may include a temporary C-RNTI and a contention resolution identity (such as a 48-bit random number). The mobile station 316 can send the scheduled transmission using the UL beamform identified by the base station 301 as a preferred beam. Also, the mobile station 316 can include additional feedback indicating a currently-preferred DL beam to the base station 301. The mobile station 316 can also send SRSs to the base station 301 based on the SRS configuration received from the base station 301, if such a configuration has been received.

The base station 301 provides contention resolution (step 1230). For example, the base station 301 may send a signal addressed to the temporary C-RNTI that includes a contention resolution identity. The signal may also include additional feedback indicating a currently-preferred UL beam to the mobile station 316.

The mobile station 316 determines whether to backoff based on the received contention resolution identity (step 1235). If the identity matches the mobile station 316, the resolution is successful and the temporary C-RNTI is promoted to a C-RNTI. However, if the identity does not match, the mobile station 316 can backoff and retry after a specified period of time.

Using this method, two levels of contention resolution may be provided, through the preamble and through the contention resolution identity. Also, beamforming may be used in each step, with beamforming feedback provided in steps other than step 1205. In addition, UL sounding may be provided to assist UL beamforming before a temporary station identifier is assigned to the mobile station 316.

Figure 13:
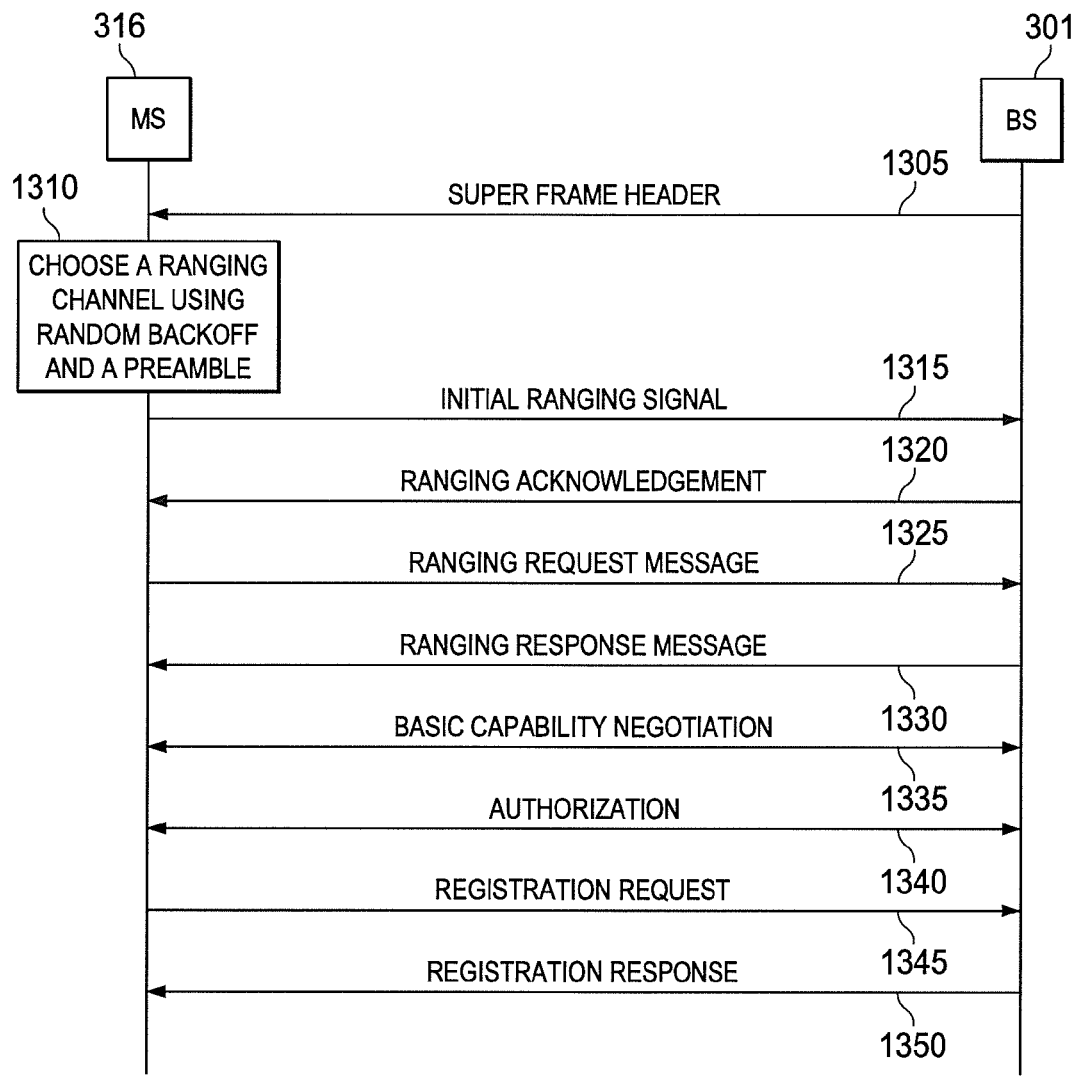
FIG. 13 illustrates a method for network entry of a mobile station in the MMB communication system of FIG. 3 implementing Mobile Worldwide Interoperability for Microwave Access (WiMAX) according to an embodiment of the disclosure.

FIG. 13 illustrates a method for network entry of a mobile station 316 in the MMB communication system 300 when the system 300 comprises massive antennas and implements Mobile Worldwide Interoperability for Microwave Access (WiMAX) according to an embodiment of the disclosure. The method shown in FIG. 13 is for illustration only. Network entry may be provided for the mobile station 316 in any other suitable manner without departing from the scope of this disclosure.

Initially, the base station 301 can send a super frame header (step 1305). The super frame header may include an initial ranging configuration, such as a preamble and the like. The mobile station 316 may choose a ranging channel using a random backoff and may also choose a preamble (step 1310). Based on these selections, the mobile station 316 can send an initial ranging signal (step 1315). The mobile station 316 can send the initial ranging signal using UL beamforming over multiple beams and can include feedback indicating a preferred DL beam to the base station 301.

The base station 301 can send a ranging acknowledgement (ACK) signal using the preferred DL beam indicated by the mobile station 316 (step 1320). The ranging ACK may include a detected preamble code, a power adjustment, a timing adjustment, an UL grant and/or the like. Also, the ranging ACK may include feedback indicating a preferred UL beam to the mobile station 316, in addition to an SRS configuration.

The mobile station 316 can send a ranging request message using the UL beamform identified by the base station 301 as a preferred beam (step 1325). Also, the mobile station 316 can include additional feedback indicating a currently-preferred DL beam to the base station 301. The mobile station 316 can also send SRSs to the base station 301 based on the SRS configuration received from the base station 301, if such a configuration has been received.

The base station 301 can send a ranging response message using the preferred DL beam indicated by the mobile station 316 (step 1330). The ranging response message may include a temporary station identifier (STID). Also, the ranging response message may include feedback indicating a currently-preferred UL beam to the mobile station 316.

After this point, additional communication through beamforming may take place. For example, the base station 301 and the mobile station 316 may engage in basic capability negotiation (step 1335) and authorization procedures (1340). Also, the mobile station 316 can send a registration request (1345), and the base station 301 may send a registration response, including the STID (step 1350).

Using this method, simplified contention resolution may be provided, as no special contention identifiers are used. Instead, contention resolution may be provided using a preamble detected in the ranging ACK. Also, beamforming may be used in each step, with beamforming feedback provided in steps other than step 1305. Also, UL sounding may be provided to assist UL beamforming before a temporary station identifier is assigned to the mobile station 316.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for a base station to support network entry of a mobile station in a communication system, comprising:
   transmitting, to the mobile station, downlink control channels comprising a random access configuration over multiple downlink beams;
   receiving, from the mobile station, over multiple uplink beams a random access signal based on the random access configuration including a preferred downlink beam from among the multiple downlink beams;
   transmitting, to the mobile station, over the preferred downlink beam, a random access acknowledge signal corresponding to the random access signal including a preferred uplink beam from among the multiple uplink beams; and
   receiving, from the mobile station, a random access request message over the preferred uplink beam,
   wherein the random access request message corresponds to the random access acknowledge signal, and
   wherein receiving the random access request message further comprises receiving, from the mobile station, a sounding reference signal over the preferred uplink beam.

2. The method of claim 1, further comprising assigning a ranging opportunity and a preamble for the mobile station when handing over the mobile station to a target base station.

3. The method of claim 1, wherein the base station comprises a plurality of antenna arrays, the method further comprising transmitting data channels from each antenna array in a frame structure that is specific to the antenna array.

4. The method of claim 1, wherein the communication system comprises a millimeter-wave mobile broadband (MMB) communication system.

5. The method of claim 4, wherein the MMB communication system is configured to implement one of Long Term Evolution (LTE), LTE-Advanced, or Mobile Worldwide Interoperability for Microwave Access (WiMAX).

6. A base station configured to support network entry of a mobile station in a communication system, comprising:
   at least one cell, wherein the cell comprises at least one antenna array, and wherein the antenna array is configured to:
   transmit, to the mobile station, downlink control channels comprising a random access configuration over multiple downlink beams;
   receive, from the mobile station over multiple uplink beams a random access signal based on the random access configuration including a preferred downlink beam from among the multiple downlink beams;

transmit, to the mobile station, over the preferred downlink beam a random access acknowledge signal corresponding to the random access signal including a preferred uplink beam from among the multiple uplink beams beams; and receive, from the mobile station, a random access request message over the preferred uplink, wherein the random access request message corresponds to the random access acknowledge signal wherein receiving the random access request message further comprises receiving, from the mobile station, a sounding reference signal over the preferred uplink beam.

7. The base station of claim 6, wherein the antenna array is further configured to transmit to the mobile station a ranging opportunity and a preamble for handover to a target base station.

8. The base station of claim 6, wherein each antenna array comprises an array-specific frame structure.

9. The base station of claim 6, wherein the communication system comprises a millimeter-wave mobile broadband (MMB) communication system.

10. A method for network entry of a mobile station in a communication system, comprising:

receiving, from a base station, downlink control channels comprising a random access configuration over multiple downlink beams; and transmitting, to the base station, over multiple uplink beams a random access signal based on the random access configuration including a preferred downlink beam from among the multiple downlink beams signal, receiving, from the base station, over the preferred downlink beam a random access acknowledge signal corresponding to the random access signal including a preferred uplink beam from among the multiple uplink beams;

transmitting, to the base station, a random access request message over the preferred uplink, wherein the random access request message corresponds to the random access acknowledge signal wherein receiving the random access request message further comprises receiving, from the mobile station, a sounding reference signal over the preferred uplink beam.

11. The method of claim 10, wherein the base station comprises a plurality of antenna arrays, wherein the downlink control channels are received from a specified one of the antenna arrays, and wherein one of the downlink control channels comprises an array identifier for the specified array and a frame structure for the specified array.

12. The method of claim 10, further comprising receiving from the base station a ranging opportunity and a preamble for use by the mobile station during handover of the mobile station to a target base station.

13. The method of claim 10, wherein the communication system comprises a millimeter-wave mobile broadband (MMB) communication system.

14. The method of claim 13, wherein the MMB communication system is configured to implement one of Long Term Evolution (LTE), LTE-Advanced, or Mobile Worldwide Interoperability for Microwave Access (WiMAX).

15. A mobile station configured to perform network entry in a communication system, comprising:

an antenna configured to:
receive, from a base station, downlink control channels comprising a random access configuration over multiple downlink;

transmit, to the base station, over multiple uplink beams a random access signal based on the random access configuration including a preferred downlink beam from among the multiple downlink beams;

receive, from the base station, over the preferred downlink beam a random access acknowledge signal corresponding to the random access signal including a preferred uplink beam from among the multiple uplink beams;

transmit, to the base station, a random access request message over the preferred uplink, wherein the random access request message corresponds to the random access acknowledge signal wherein receiving the random access request message further comprises receiving, from the mobile station, a sounding reference signal over the preferred uplink beam.

16. The mobile station of claim 15, wherein the antenna is further configured to receive from the base station a ranging opportunity and a preamble for use by the mobile station during handover of the mobile station to a target base station.

17. The mobile station of claim 15, wherein the base station comprises a plurality of antenna arrays, wherein the downlink control channels are received from a specified one of the antenna arrays, and wherein one of the downlink control channels comprises an array identifier for the specified array and a frame structure for the specified array.

18. The mobile station of claim 15, wherein the communication system comprises a millimeter-wave mobile broadband (MMB) communication system.

19. The mobile station of claim 15, wherein the initial network entry signal comprises an initial random access signal, wherein the subsequently received network entry signals comprise a random access acknowledge signal, and wherein the subsequently transmitted network entry signal comprise a random access request message.

* * * * *